US008451842B2

(12) United States Patent
Mack-Crane et al.

(10) Patent No.: US 8,451,842 B2
(45) Date of Patent: May 28, 2013

(54) MEDIA ACCESS CONTROL BRIDGING IN A MESH NETWORK

(75) Inventors: T. Benjamin Mack-Crane, Downers Grove, IL (US); Robert Sultan, Somers, NY (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 350 days.

(21) Appl. No.: 12/762,659

(22) Filed: Apr. 19, 2010

(65) Prior Publication Data
US 2010/0272108 A1     Oct. 28, 2010

Related U.S. Application Data

(60) Provisional application No. 61/171,954, filed on Apr. 23, 2009.

(51) Int. Cl.
*H04L 12/28* (2006.01)
*H04L 12/56* (2006.01)

(52) U.S. Cl.
USPC .. 370/392; 370/389; 370/395.31; 370/395.32

(58) Field of Classification Search
USPC ................ 370/389, 392, 395.31, 395.32
See application file for complete search history.

(56) References Cited

U.S. PATENT DOCUMENTS

| 7,515,600 | B1 | 4/2009 | Savage et al. |
| 2004/0255050 | A1 | 12/2004 | Takehiro et al. |
| 2007/0058602 | A1 | 3/2007 | Shimada |
| 2008/0304480 | A1 | 12/2008 | Langguth |

FOREIGN PATENT DOCUMENTS

| EP | 1770904 | A1 | 4/2007 |
| EP | 1944924 | A1 | 7/2008 |
| EP | 2202917 | A1 | 6/2010 |
| WO | 2006077173 | A1 | 7/2006 |
| WO | 2008031868 | A1 | 3/2008 |
| WO | 2009023791 | A1 | 2/2009 |

OTHER PUBLICATIONS

"IEEE Standard for Local and Metropolitan Area Networks—Virtual Bridged Local Area Networks," IEEE Standard 802.1Q™—2005, May 19, 2006.

(Continued)

*Primary Examiner* — Ayaz Sheikh
*Assistant Examiner* — Blanche Wong
(74) *Attorney, Agent, or Firm* — Conley Rose, P.C.; Grant Rodolph; Rayhao Chung

(57) ABSTRACT

A network comprising a switch configured to learn a source address (SA) for a source node with a source port that receives a frame comprising the SA if the SA is not previously learned on another port and to subsequently forward any frame comprising a destination address (DA) for a destination node that matches the learned SA on the source port associated with the SA. A network comprising a switch configured to flood a frame received on a receiving port if the frame comprises a DA that is not previously learned on a source port and to distinguish the flooded frame from other forwarded frames by labeling the flooded frame, wherein the frame is flooded on a plurality of ports. A method comprising disabling a plurality of filtering database (FDB) entries that correspond to a plurality of addresses that are associated with a port, and sending the addresses in a control frame.

20 Claims, 13 Drawing Sheets

OTHER PUBLICATIONS

"Draft Standard for Local and Metropolitan Area Networks—Virtual Bridged Local Area Networks—Amendment 9: Shortest Path Bridging," P802.1aq/D1.5, Dec. 17, 2008.

Ibáñez, G. et al., "Fast Path Ethernet Switching: On-demand, Efficient Transparent Bridges for Data Center and Campus Networks," 2010.

Ibáñez, G., "Fast Path Bridges—Old and New Ideas for the Evolution of Transparent Bridges,"—IEEE 802.1 Interim Meeting, Sep. 2009.

Perlman, R., et al., "Rbridges: Base Protocol Specification," draft-ietf-trill-rbridge-protocol-12.txt, Mar. 6, 2009.

Linge, N., et al., "Protocol-Less Bridges for Local Area Networks," Summary of Comments on Protocol-less Bridges for Local Area Networks—Third IEEE Conference on Telecommunications, 1991, pp. 229-223.

Perlman, R., et al., "Rbridges: Base Protocol Specification," draft-ietf-trill-rbridge-protocol-06.txt, Nov. 2007.

Foreign communication from a counterpart application, PCT application PCT/US2010/031574, International Search Report and Written Opinion, Jul. 22, 2010, 20 pages.

MEDIA ACCESS CONTROL BRIDGING IN A MESH NETWORK

CROSS-REFERENCE TO RELATED APPLICATIONS

The present application claims priority to U.S. Provisional Patent Application No. 61/171,954 filed Apr. 23, 2009 by Linda Dunbar, et al. and entitled "Method for Media Access Control Bridging in a Mesh Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data through the network. The nodes may include routers, switches, and/or bridges that transport the individual data frames or packets through the network. For example, the Institute of Electrical and Electronics Engineers (IEEE) 802.1Q compliant Ethernet switches forward data frames based on their learned or provisioned filtering database (FDB). As such, the frames can be forwarded based on an associated destination address (DA) and a virtual local area network (VLAN) identifier (VID). If the FDB does not comprise an entry that matches an incoming frame's DA and VID, the frame can be flooded to all the ports except the one on which the frame arrived. Accordingly, the data frames can be forwarded between the nodes in a single network (or domain) or in different networks (or domains).

SUMMARY

In one embodiment, the disclosure includes a network comprising a switch configured to learn a source address (SA) for a source node with a source port that receives a frame comprising the SA if the SA is not previously learned on another port and to subsequently forward any frame comprising a DA for a destination node that matches the learned SA on the source port associated with the SA.

In another embodiment, the disclosure includes a network comprising a switch configured to flood a frame received on a receiving port if the frame comprises a DA that is not previously learned on a source port and to distinguish the flooded frame from other forwarded frames by labeling the flooded frame, wherein the frame is flooded on a plurality of ports.

In another embodiment, the disclosure includes a network component comprising at least one processor configured to implement a method comprising receiving a non-flooded frame comprising a DA on a port, and adding the port to a set of flooding ports associated with the DA if the DA is not a group address.

In another embodiment, the disclosure includes a method comprising receiving a frame comprising an unlearn address (UA), and removing a FDB entry for the UA.

In yet another embodiment, the disclosure includes a method comprising disabling a plurality of FDB entries that correspond to a plurality of addresses that are associated with a port, and sending the addresses in a control frame.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
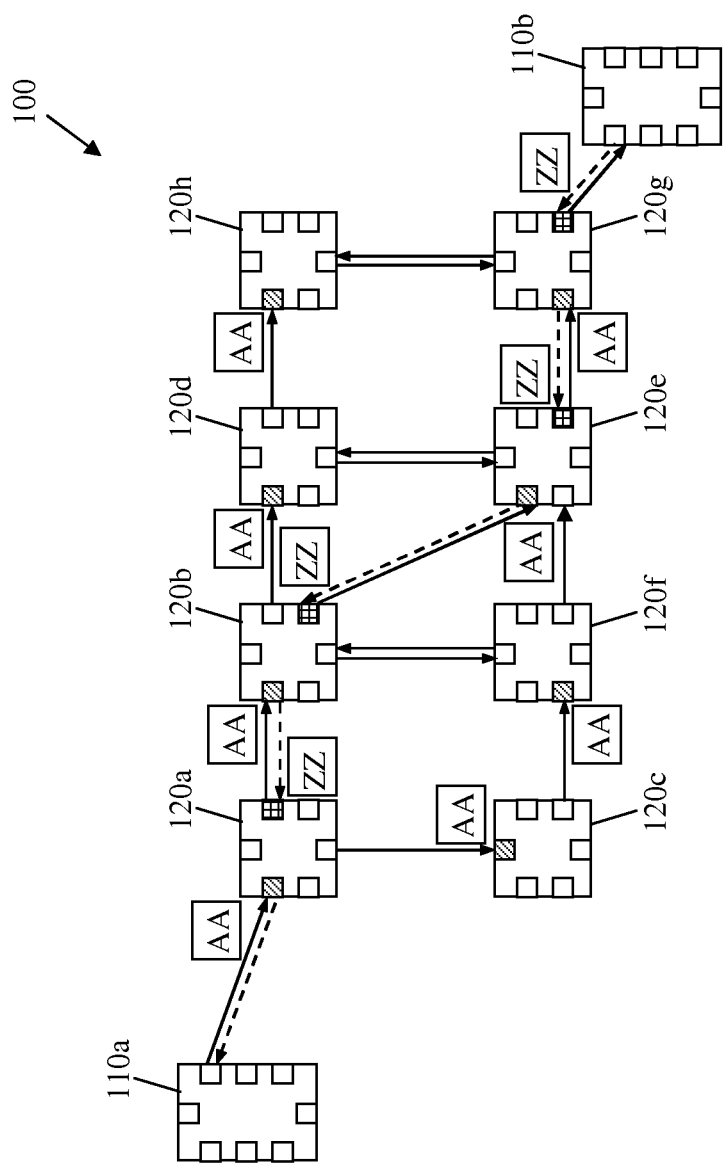
FIG. 1 is a schematic diagram of an embodiment of a bridged path in a network.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, Ethernet switches may establish FDB entries for Media Access Control (MAC) bridging using flooding and learning (e.g. frame flooding and address learning) based on a network tree topology. The network tree topology configuration may allow the use of flooding and learning to establish FDB entries for unicast data frames. Additionally, a link state routing protocol based on a network topology may be used to establish a least cost path and thus achieved Shortest Path Bridging (SPB). However, the link state routing method may have several disadvantages, including the need to distribute a network topology database to a plurality of bridges in the network.

Disclosed herein are systems and methods for MAC bridging using improved frame flooding and address learning behavior. Accordingly, a plurality of nodes (e.g. bridges) in a network may establish FDB entries, e.g. locally, using improved flooding and learning without the requirement (or limitation) of a network tree topology. The network may be a Local Area Network (LAN) or may comprise a plurality of VLANs that may be identified using different VIDs. The VIDs may be used in the FDB entries to associate the node's ports with the corresponding VLANs. The flooding and learning behavior may also establish a shortest delay path without using link state routing and therefore without having a topology database overhead. Additionally or alternatively, the flooding and learning behavior may enable load balancing over the established path links in the network. The FDB entries may be established by learning a SA for a received frame on a single port and flooding a received frame comprising an unknown DA only if the frame is received on the port on which the frame's SA has been learned. Equivalently, in the case of a plurality of VLANs in the network, the FDB entries may be established by learning SA/VID pairs for the received frame and flooding the frame on all the node's ports associated with the frame's VID except the port on which the frame was received. As disclosed herein, the term address and address/VID pairs may interchangeable, e.g. in the case of handling traffic for multiple VLANs. Such learning and flooding behavior may reduce the amount of traffic forwarded in the network and may provide shortest delay path and/or traffic load balancing. Additionally, control frames may be forwarded between the nodes to relearn FDB entries, e.g. due to relocating an external system or adding a link, or to disable FDB entries, e.g. due a link fault.

FIG. 1 illustrates an embodiment of a bridged path in a network 100 that comprises a plurality of end nodes 110 and internal nodes 120. The network 100 may be any network within which a plurality of data packets may be transported between the end nodes 110, the internal nodes 120, or both. For instance, the network 100 may be an Ethernet based network configured to transfer Ethernet frames or packets between the end nodes 110 via the internal nodes 120. In an embodiment, the network 100 may run any one of a variety of protocols, such as Ethernet, or Internet Protocol (IP), among others.

The end nodes 110 and the internal nodes 120 may be coupled to one another using optical links, electrical links, wireless links, or combinations thereof. The arrow lines in FIG. 1 show packet flows on some of the links that may exist between the end nodes 110 and the internal nodes 120. The end nodes 110 and the internal nodes 120 may also be connected by other links that are not shown in FIG. 1. The end nodes 110 and the internal nodes 120 may be any devices or components that may produce, receive, and/or transport data packets. For example, the end nodes 110 and the internal nodes 120 may include bridges, switches, routers, or various combinations of such devices. The end nodes 110 and the internal nodes 120 may each comprise a plurality of ports for receiving and/or forwarding packets from other nodes, and logic circuitry to determine which node(s) to forward the packets to. The end nodes 110 may comprise source ports and/or destination ports, which may produce and/or receive data streams. In an embodiment, the end nodes 110 may be edge nodes, e.g. Provider Edge Bridges (PEBs) or Backbone Edge Bridges (BEBs). In other embodiments, the end nodes 110 may be servers or may be coupled to user-oriented devices, such as desktop computers, notebook computers, personal digital assistants (PDAs), or other communication devices.

The internal nodes 120, e.g. the internal nodes 120*a*, 120*b*, 120*c*, 120*d*, 120*e*, 120*f*, 120*g*, and 120*h*, may be configured to forward packets, e.g. Ethernet packets, between the end nodes 110. For example, the internal nodes 120 may be bridges that forward the packets between the end nodes 110. The packets may be forwarded between the internal nodes 120 over a bridged path and thus exchanged between any two end nodes 110. The bridged path may be learned based on addresses associated with the end nodes 110. Specifically, the packets may comprise a SA that indicates a source port or interface of one of the end nodes 110, a DA that indicates a destination port or interface of one of the end nodes 110, or both. The SA and/or DA may be MAC addresses, which may be maintained in local FDBs in the internal nodes 120 and associated with the ports of the internal nodes 120. Alternatively, the addresses may be maintained and associated with the ports in a FDB at a management plane or a management system (MS), which may be at any of the end nodes 110 or the internal nodes 120.

In an embodiment, the internal nodes 120 may be configured to forward a packet or frame from a first end node 110 to a second end node 110 based on a flooding and learning behavior according to the SA and DA in the frame. For instance, the internal nodes 120 may be correspond to a mesh bridging domain, where the flooding and learning behavior may be used according to a general mesh topology that may not be restricted to a tree-like topology. However, the end nodes 110 may be external to the mesh bridging domain and as such may not operate based on the same flooding and learning behavior of the internal nodes 120. Specifically, when an internal node 120 receives a frame comprising an unknown SA via a receiving or source port, the internal node 120 may associate the SA with the source port if the SA is not found in the internal node's FDB (or at the management plane/MS). The internal nodes may also be configured to associate the SA with a single port, e.g. add a single FDB entry for the SA. Further, if the received frame comprises an unknown DA and the frame is not labeled as a flood frame, then the internal node 120 may label the frame as a flood frame and flood the frame on all of its ports except the port on which the frame was received, i.e. the SA source port. In an embodiment, the frame may be labeled as a flood frame when transmitted on internal ports coupled to neighboring internal nodes 120. However the frame may not be modified or labeled as a flood frame when transmitted on an external port coupled to a node 110 that is external to the mesh bridging domain. In the case of a plurality of VLANs in the network, the frame may be flooded on all ports associated with the frame's VID except the port on which the frame was received.

If a flooded frame, e.g. labeled as a flood frame, is received on a port that is not associated with the SA in the frame, then the internal node 120 may filter the frame, e.g. discard or delete the frame. As such, the frame received on a source port associated with the SA and comprising an unknown DA may be flooded on a single hop between each two internal nodes 120 but may not be flooded on subsequent hops between subsequent internal nodes 120. This flooding behavior may prevent the propagation of the frame over multiple subsequent links, e.g. multiple subsequent flooding, and hence reduce network load and congestion and prevent looping.

For example, the end node 110*a* may send a frame, e.g. a unicast frame, destined to the end node 110*b* and comprising a SA "AA" corresponding to the end node 110*a* and a DA "ZZ" corresponding to the end node 110*b*. The internal node 120*a* may receive the frame on a port and may not find the SA "AA" in the local FDB since the address "AA" may not be associated with any port of the internal node 120*a*. Thus, the internal node 120*a* may add an entry in the FDB that associates the address "AA" with the source port. In FIG. 1, the source ports associated with the address "AA" are represented by boxes patterned with diagonal lines. Further, the internal node 120a may not find the DA "ZZ" in the local FDB. Consequently, the internal node 120a may label the frame as a flood frame, and flood the frame on its ports, but not the source port. Hence, each of the internal nodes 120b and 120c may receive a copy of the frame that is labeled as a flood frame.

In an embodiment, the frame may be labeled, e.g. as a flood, disable, and/or unlearn frame, by adding a label or tag to the frame that indicates that the frame is flooded from a source or neighboring node. Alternatively, the frame may be labeled by setting a bit in the frame, e.g. a group bit in the SA in the header or any bit that is to be reserved in the header, which indicates that the frame is flooded. However, when learning the SA in the flooded frame, the SA bit used to indicate a flooded frame may be reset in the FDB. In another embodiment, the flooded frame may be sent using a Relay Control Frame (RCF).

The internal nodes 120b and 120c may use the same learning and flooding behavior as the internal node 120a. As such, the internal nodes 120b and 120c may associate the address "AA" with their corresponding source ports, label the frames as flood frames, and flood the frames on their ports to their neighboring nodes, e.g. the internal nodes 120d, 120e, and 120f, but not on their corresponding source ports. However, the internal node 120f may receive two copies of the flood frame from each of the internal nodes 120b and 120c on two different ports. In this case, the internal node 120f may associate the address "AA" with only one of the two ports, which may be the first port that receives a copy of the frame. For example, the internal node 120f may associate the address "AA" with the source port coupled to the internal node 120c, which is represented by the patterned box in FIG. 1. Subsequently, when the internal node 120f receives the second copy of the flood frame from the internal node 120b, the internal node 120f may recognize that the SA "AA" in the frame is associated with another source port and hence may filter the frame.

Similarly, the internal node 120e may receive a first copy of the flood frame on a first source port from the internal node 120b, and then a second copy of the flood frame on a second port from the internal node 120d. As such, the internal node 120e may associate the address "AA" with the first source port, flood the first copy of the frame, and discard the second copy of the frame. The remaining internal nodes 120d, 120h, and 120g may also receive flooded frames and implement the same flooding and learning logic as the previous internal nodes 120. As such, the internal nodes 120 may each associate the address "AA" with one corresponding source port and flood the frame on their ports except their corresponding source ports, or discard the frame when it is not received on the SA associated source port. Thus, one copy of the flood frame may be delivered to the end node 110b by the internal node 120g. The flood label may be removed before transmitting the frame to the external node 110b. The paths of the forwarded frames comprising the SA "AA" are shown by solid arrow lines in FIG. 1.

Next, the end node 110b may send a frame destined to the end node 110a and comprising a SA "ZZ" corresponding to the end node 110b and a DA "AA" corresponding to the end node 110a. The internal node 120g may receive the frame on a source port and may not find the SA "ZZ" in the local FDB. Thus, the internal node 120g may add an entry in the FDB that associates the address "ZZ" with the source port. In FIG. 1, the source ports associated with the address "ZZ" are represented by boxes patterned with crossed lines. The internal node 120g may find the DA "AA" associated with a port coupled to the internal node 120e in the local FDB, and hence may forward the frame on the port to the internal node 120e. Similarly, the internal node 120e may receive the frame, associate the address "ZZ" with the source port coupled to the internal node 120g, and forward the frame on the port associated with the address "AA" to the internal node 120b. Following the same learning and forwarding behavior, the internal nodes 120b and 120a may in turn receive the frame, associate the address "ZZ" with their corresponding source ports, and forward the frame on the corresponding ports associated with the address "AA" until the frame is delivered to the end node 110a. The paths of the forwarded frame comprising the SA "ZZ" are shown by dashed arrow lines in FIG. 1.

The internal nodes 120a, 120b, 120e, and 120g may use the flooding (or forwarding) and learning behavior described above to send frames in either or both directions between the end nodes 110a and 110b and consequently establish a bidirectional path between the end nodes 110a and 110b. The bidirectional path is shown by the pairs of solid arrow lines and dashed arrow lines in FIG. 1. The path established between the end nodes 110a and 110b may be a lowest or shortest delay path where a minimum number of internal nodes 120 or links may forward the frames between the end nodes 110. Forwarding the frames using a minimum number of nodes or links may result in a shortest time delay. The shortest delay path may be learned using the flooding and learning behavior described above without measuring link delay, without using a link state protocol and without maintaining delay information in a topology database in the network. Additionally, the path between the end nodes 110 may be established by the internal nodes 120 with any suitable topology, e.g. without restricting the useable nodes and links to a tree like topology.

Alternatively, when the links between the nodes have somewhat equivalent data rate, length, and traffic load and accordingly about equal delay times, the flooding and learning behavior of the nodes may provide load spreading or balancing over the links between the nodes. For instance, if some links are more heavily used than other links and therefore experience greater queuing delays, the forwarding and learning behavior may provide load spreading to alternate links that have smaller queuing delays. In an embodiment, to minimize the effect of uneven traffic load on the links, the flooded frames may be given a high forwarding priority over other frames in the forwarding queues of the links. Consequently, the flooded frames may be forwarded regardless of the queuing delays of the links, which may be substantially similar to the case of about equal forwarding time delays on the links. In another embodiment, to improve the load spreading effect over the links, flooded frames may have randomly selected delays added, e.g. transmission of flood frames on each output port may be delayed by a randomly selected value within a delay time variance, to provide delay time variations for the frames and cause learning over paths that have about equal delays and provide load spreading that is not prone to oscillation due to variation in traffic loads.

Figure 2:
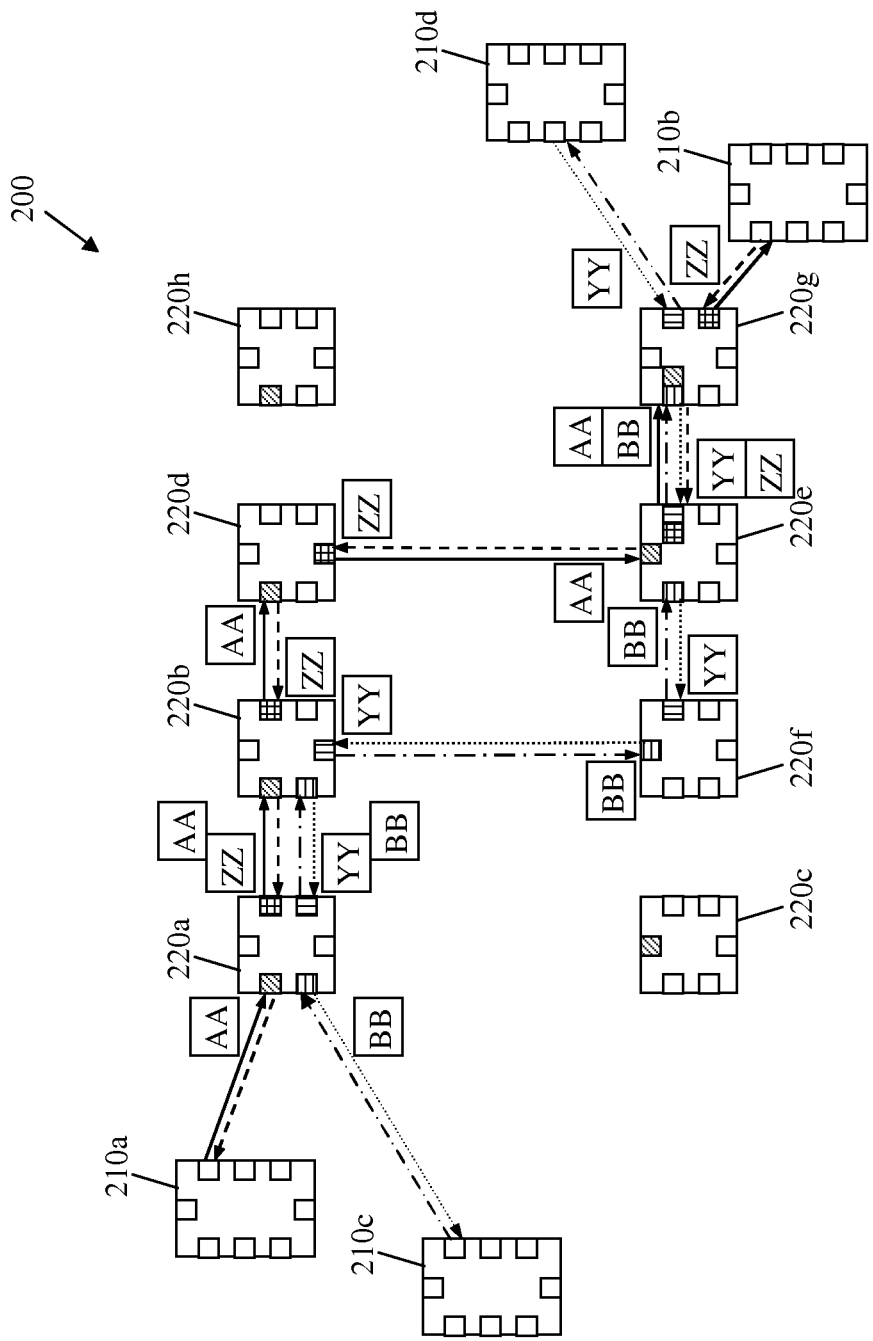
FIG. 2 is a schematic diagram of another embodiment of a bridged path in a network.

FIG. 2 illustrates another embodiment of a bridged path in a network 200. The network 200 may be configured substantially similar to the network 100 and may comprise a plurality of end nodes 210 and a plurality of internal nodes 220, which may be configured substantially similar to the corresponding components of the network 100. Specifically, the internal nodes 220 may establish a first bridged path between a first pair of end nodes 210 and a second bridged path between a second pair of end nodes 210. The internal nodes 220 may establish the first bridged path and the second bridged path using the flooding and learning process described above. Each of the first bridged path and second bridged path may correspond to about equal delay paths between the corresponding pairs of end nodes 210. Additionally, some of the internal nodes 220 may belong to both the first bridged path and the second bridged path and may share at least some ports on both paths. For instance, some of the internal nodes 220 may associate different addresses of the end nodes 210 (e.g., "AA," "BB," "YY," and/or "ZZ") with the same source port. However, each address may only be associated with one port in any internal node 220. When an address of the end nodes 210 is associated with a first source port of the internal node 220, the same address may not be subsequently associated with a second source port of the internal node 220, e.g. without disabling or removing the FDB entry for the first source port.

For example, the internal nodes 220a, 220b, 220d, 220e, and 220g may learn the first bridge path, which may be a bidirectional path, between the end node 210a and the end node 220b. The first bridged path may be obtained by learning the address "AA" of the end node 210a and the address "ZZ" of the end node 210b and by flooding or filtering the received frames with unknown addresses, as described above. The bidirectional first bridged path is shown by the pair of solid arrow lines (from end node 210a to end node 210b) and dashed arrow lines (from end node 210b to end node 210a). The source ports associated with the address "AA" are represented by boxes patterned with diagonal lines and the source ports associated with the address "ZZ" are represented by boxes patterned with crossed lines.

Similarly, the internal nodes 220a, 220b, 220f, 220e, and 220g may learn the second bridge path, which may be a bidirectional path, between the end node 210c and the end node 220d. The second bridged path may be obtained by learning the address "BB" of the end node 210c and the address "YY" of the end node 210d and by flooding or filtering the received frames with unknown addresses, as described above. The bidirectional second bridged path is shown by the pair of dashed and dotted arrow lines (from end node 210c to end node 210d) and dotted arrow lines (from end node 210d to end node 210c). The source ports associated with the address "BB" are represented by boxes patterned with horizontal lines and the source ports associated with the address "YY" are represented by boxes patterned with vertical lines. As shown in FIG. 2, the addresses "AA," "BB," "YY," and "ZZ" may be associated with different source ports in some of the internal nodes 220. Alternatively, in other internal nodes 220, some of the address may be associated with the same source port. For example, the addresses "AA" and "BB" are associated with the same source port in the internal node 220g and the addresses "YY" and "ZZ" are associated with the same source port in the internal node 220e.

In an embodiment, the flooding and learning behavior may handle forwarding multicast frames comprising group DAs. Since the group DA may not appear as a SA in a received frame, the nodes may not learn a group DA, e.g. associate the group DA with a source port. As such, the nodes may flood the frames comprising the group DA on a plurality of ports. Such flooding of multicast frames in the network may not be desired or practical since it may cause increase in unwanted network traffic, e.g. when flooding the multicast frames to a plurality of nodes that are not subscribed to receive the multicast frames.

To avoid the undesired flooding of multicast frames that comprise group DAs, the group DAs may be learned by the nodes and may be recognized and distinguished from the flooded frames. For instance, the group DAs in the network may be provisioned and maintained by the management plane or MS in a FDB, which may comprise static group DA entries. Alternatively, the node or the MS may "snoop" a client multicast group protocol (e.g., Internet Group Management Protocol (IGMP)) and add corresponding FDB entries for MAC group address forwarding. In another embodiment, a control protocol may be used by forwarding a RCF to create the multicast FDB entries, e.g. based on a request from the client network to create a multicast forwarding state in a MAC bridged network. The control protocol may be an extension of an existing group address control protocol in the network (e.g., Multiple MAC Address Registration Protocol (MMRP)) or a new protocol configured to operate with the flooding and learning process.

Additionally, to improve the handling and forwarding of multicast frames comprising group DAs, the node may learn the port on which a non-flooded unicast frame DA (non-group DA) is received. The node may associate the DA with the port on which the DA was received by adding a corresponding entry in the FDB. The port on which the non-flooded DA is received may be coupled to a neighboring node's source port associated with the DA and hence that may allow an incoming frame comprising a group DA and the received DA as its SA to be forwarded (not filtered). As such, the node may subsequently send the multicast frames comprising a group DA and the learned DA as SA to the ports associated with the learned DA in the FDB but not on the remaining ports associated with the frame's VID. Thus, the multicast frames may be forwarded only to the neighboring nodes that may not discard or filter the received frames.

In an embodiment, the flooding and learning behavior of the nodes may handle relocation of addresses, e.g. MAC addresses. For example, when an end node or station is moved from a link with a node or bridge port to a link with another node or port, the learned source port for the end node's address, e.g. the port associated with that address, may become invalid. As such, the FDB entry corresponding to the end node's address may be removed in the nodes and a new entry that associates the end node's address with the new port may be added, e.g. by aging out old FDB entries and learning new entries from new frames. However, the aging process may not provide a sufficiently rapid relearning process. Alternatively the internal nodes in the network may be alerted to the change of location of the address (e.g. SA) of the end node and hence may more quickly associate the address with new learned source ports.

Specifically, when a network bridge or internal node receives from an end node (or external bridge) a frame comprising an unknown SA or a known SA on a non-associated port, the internal node may flood an Unlearning RCF (URCF) to the neighboring nodes via ports associated with the VID of the received frame. The unknown SA or known SA appearing on a new external port is identified as an UA. The node may also learn the unknown SA or update the known SA's associated source port. The URCF may comprise the UA in a payload of the frame, the originating node's own address as SA, a predefined group DA, and the same VID as the received frame. Each node may then receive and accept the URCF only on its corresponding URCF SA source port and may recognize the UA in the payload of the frame as an unlearn address. If the UA is previously learned, e.g. is found in the local FDB, the node may remove the FDB entry associated with the UA. The node may then flood the URCF, e.g. to all ports associated with the URCF's VID except the source port. Further, the URCF may be flooded on an internal port, e.g. to any neighboring internal node in the mesh bridging domain, but not on an external port to an end node or external node outside the mesh bridging domain.

In an embodiment, the flooding and learning behavior of the nodes may handle new added links in the network. When a new link is added to a network bridge or node, the node may use the new link to begin forwarding some of its frames. The flooding and learning behavior may allow the nodes to remove aging FDB entries, e.g. after a period of time expires, and replace the aged entries with new entries that correspond to new learned paths including the new link. For instance, when aged entries that associate addresses with ports are removed, traffic frames may be flooded to learn new paths including the new link. Over time, the new link may pick up more traffic as more FDB entries age out and more flooding and learning occurs.

In an embodiment, the nodes may be configured to flood the frames comprising a known address (e.g. know SA) to unlearn the existing path for the address, to allow a new path to be learned which may include a new link. The address to be unlearned is identified as an UA. The frames to unlearn a known SA may be flooded occasionally, for instance in a periodic manner. The node may send a control frame, e.g. a URCF, comprising the UA in a payload of the frame, the originating node's own address as SA, a predefined group DA, and the VID for which the UA should be unlearned. Nodes receiving a URCF on the SA source port may delete their FDB entry for the UA and forward the URCF on all ports associated with the URCF VID except the receive port. The URCF unlearn function may be indicated, for example, by a predefined group DA. Subsequent frames sent with the unlearned address as the SA may cause the nodes to learn a new path when a new link is added. As such, the new link may be added to a learned path before a FDB entry is aged out, which may provide improved or more optimized new paths in the network. Further, periodically learning new paths that include new links may rebalance traffic over the links in the network.

In an embodiment, the flooding and learning behavior of the nodes may handle link faults in the network. When a link fails, the nodes may disable the learned FDB entries corresponding to the ports associated with the failed link. As such, the frames destined to the addresses in the FDB entries, e.g. comprising DAs associated with the ports, may be flooded rather than forwarded toward the failed link. However, a non-flooded frame, e.g. not labeled as a flood frame, may be discarded if the frame is destined to be forwarded on a failed link, e.g. is received and has a disabled FDB entry matching the individual DA. A non-flooded frame destined to be forwarded on the failed link and received after disabling the FDB entry corresponding to the failed link may be flooded to learn new paths if it is received on a port external to the mesh bridging domain of the nodes.

In an embodiment, when an link is moved, e.g. from a learned source port of a first node to a port of a second node, the moved link may be handled as a link fault on the source port of the first node and a new added link on the port of the second node. Accordingly, the learned addresses associated with the source port of the first node may be flooded to disable the source ports associated with those addresses in the neighboring nodes, as described above. Subsequently, traffic frames may be forwarded or flooded between the nodes to learn new paths including the new link on the port of the second node.

Figure 3:
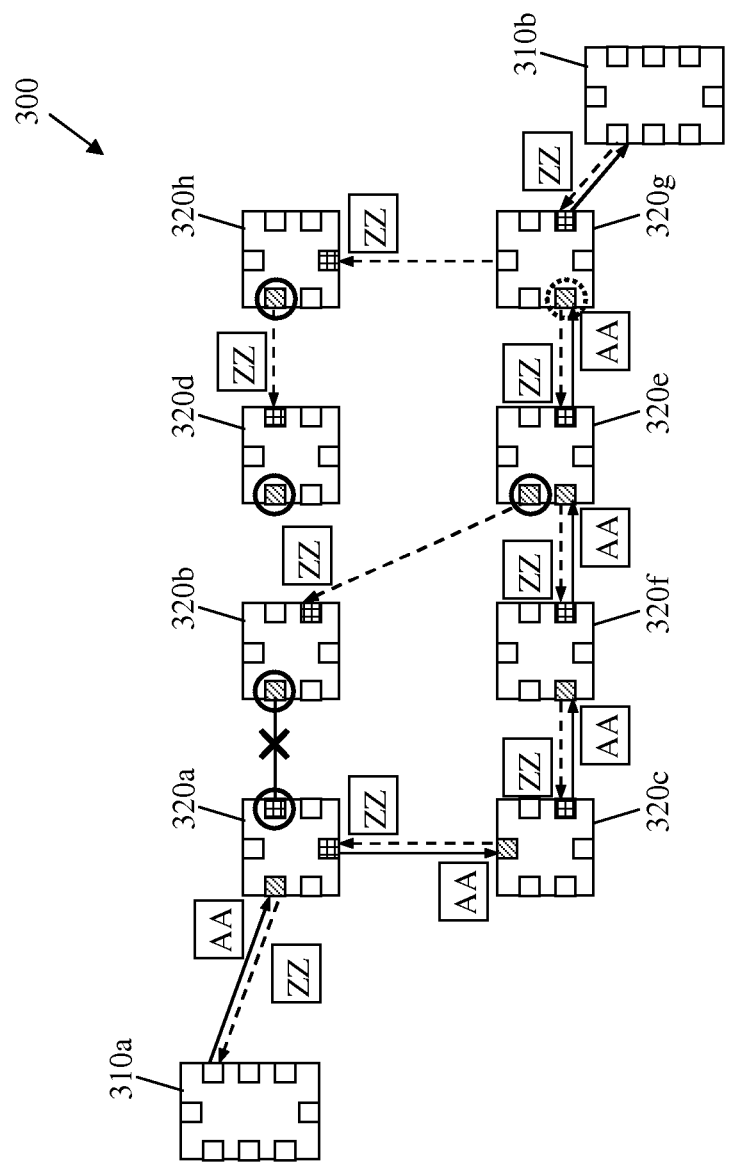
FIG. 3 is a schematic diagram of an embodiment of a failed bridged path in a network.

FIG. 3 illustrates an embodiment of a failed bridged path in a network 300. The network 300 may comprise a plurality of end nodes 310 and a plurality of internal nodes 320. The network 300 and its components may be configured substantially similar to the network 100 and its corresponding components. At least some of the internal nodes 320, e.g. internal nodes 310a, 320b, 320e, and 320g may initially establish a bridged path, e.g. a bi-directional path, between two end nodes 310a and 310b. As such, each of the internal nodes on the path may learn the address "AA" of the end node 310a and the address "ZZ" of the end node 310b, e.g. using the flooding and learning logic described above. Other internal nodes 320 (e.g. 320c, 320d, 320f, and 320h) may also learn the addresses "AA" and "ZZ" during the flooding and learning scheme. Subsequently, when a link that couples the internal nodes 320a and 320b on the path fails (indicated by the "X" mark), the internal node 320b may detect a link fault on one of its ports corresponding to the link, and hence disable any learned FDB entries corresponding to the failed port. The internal node 320b may also flood any learned addresses associated with the disabled port in the disabled FDB entries to the neighboring nodes. For example, the internal node 320b may send a control frame to the internal nodes 320d and 320e indicating that the address "AA" of the end node 310a is disabled. Each of the internal nodes 320d and 320e may receive the disabled address, verify that they have a learned FDB entry for that address identifying the port over which the control frame was received, disable the corresponding FDB entries, and similarly flood the address to their neighboring nodes. As such, the internal nodes 320h and 320g may similarly disable their corresponding FDB entries. The source ports corresponding to the disabled FDB entries are represented by solid circles in FIG. 3. However, the internal node 320f may determine that its FDB entry for address "AA" does not identify the port over which the disable control frame was received and may thus leave its FDB entry for "AA" unchanged and may not forward the control frame further.

Next, the flooding and learning process may be repeated, e.g. beginning at node 320g, to reestablish a new bridged path between the end nodes 310a and 310b, e.g. along the internal nodes 320a, 320c, 320f, 320e, and 320g. The new bridged path may be a bi-directional path that comprises a first path from the end node 310b to the end node 310a, which may be established by flooding a frame with the DA "AA" from the end node 310b (as indicated by the dashed arrow lines). The bi-directional path may also comprise a second path from the end node 310a to the end node 310b, which may be established by forwarding a frame with the DA "ZZ" from the end node 310a (as indicated by the solid arrow lines). The source ports associated with the SAs on the new established paths are represented by the patterned boxes (diagonal lines for "AA" and crossed lines for "ZZ) without circles. The dotted circle of the internal node 320g indicates an FDB entry that was initially disabled due to the failed link and then reactivated by learning the address "AA" on the second path.

In an embodiment, to provide link fault recovery, an internal node or bridge may disable the corresponding FDB entry, e.g. upon detecting a link failure, and flood a Disable RCF (DRCF) over the remaining links/ports associated with the VID of the disabled FDB entry to the neighboring nodes. The DRCF may comprise all the learned addresses (or address/VID pairs) that may be associated with the port corresponding to the failed link. When a neighboring node receives the DRCF on a port that is a source port for one of the addresses (or address/VID pairs) indicated in the DRCF, the node may disable the FDB entry corresponding to the port/address/VID and leave that address/VID in the DRCF. Alternatively, if the node receives the DRCF on a port that is not associated with an address/VID indicated in the DRCF, the node may remove the address/VID from the DRCF. If any address/VID associated with the failed link remains in the DRCF, the node may flood the DRCF to a plurality of neighboring internal nodes associated with the remaining VIDs.

Further, the DRCF may be flooded on an internal port, e.g. to any neighboring internal node in the mesh bridging domain, but not on an external port to an end node or external node outside the mesh bridging domain. In some embodiments to handle the case of lost DRCFs, the node may discard any received non-flooded frame that comprises a DA/VID, which has been previously disabled at the node, and then send back a DRCF that comprises the DA/VID on the same port the frame was received. As such, the sender of the non-flooded frame may receive the DRCF and disable any FDB entries that are associated with the disabled DA/VID, which may not have been previously disabled due to a loss of a DRCF.

Figure 4A:
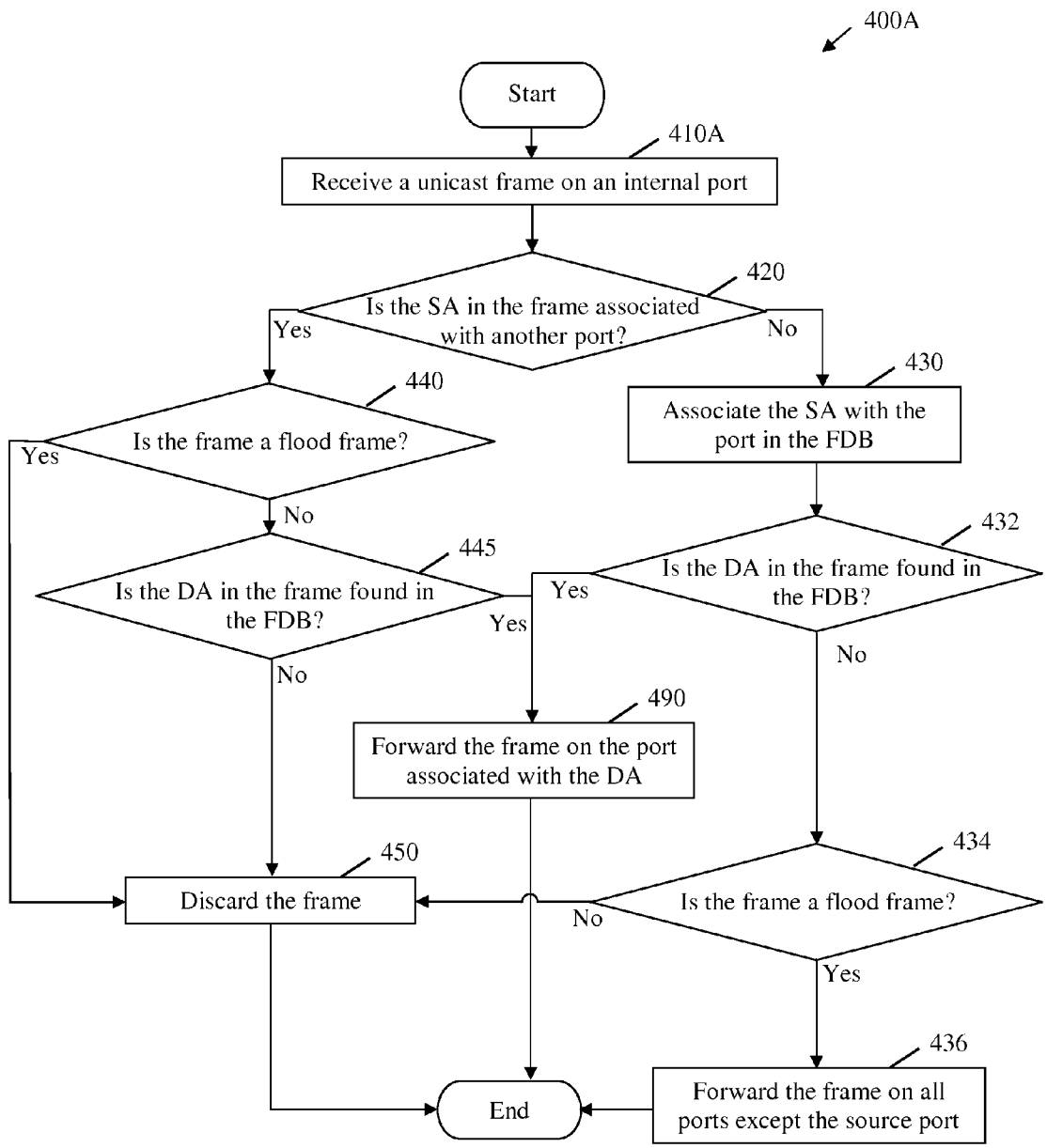
FIG. 4A is a flowchart of an embodiment of a learning and forwarding method.

FIG. 4A illustrates an embodiment of a learning and forwarding method 400A, which may be used to establish a bridged path between a plurality of bridges or switches (e.g. Ethernet switches) that may not correspond to a tree like topology. The method 400A may be used to learn a shortest delay path and/or provide traffic load balancing over about equal delay paths between the bridges, which may be achieved without using a link state protocol and without maintaining a network topology database. For example, the bridges that may implement the method 400A may comprise the internal nodes 120 of the network 100. The method 400A may be implemented at any of the internal nodes 120 that receive a frame on an internal port of a mesh bridging domain, such as from another internal node 120. Further, the frame may be a unicast frame that comprises a unicast or individual DA but not a group DA.

The method 400A may begin at block 410A, where a unicast frame may be received on an internal port of the bridge. For example, the bridge may receive an Ethernet frame on a link coupled to one of its ports (or interfaces). The frame may comprise a SA that indicates the source of the frame, a DA that indicates the destination of the frame, or both. At block 420, the method 400A may determine whether the SA in the frame is associated with another port of the bridge that is different from the receiving port. For example, the bridge may search its local FDB entries to determine whether the received SA is associated with the receiving port. If the SA in the frame is associated with another port, then the method 400A may proceed to block 440. If the condition in block 420 is not met, then the method 400A may proceed to block 430.

At block 430, the SA may be associated with the port in the FDB. For example, the bridge may add an entry in the FDB to register the receiving port as the source port for the SA in the received frame or reset an aging timer for an FDB entry found for the SA. At block 432, the method 400A may determine whether the DA in the frame is found in the FDB. If the DA in the frame is found in the FDB, then the method 400A may proceed to block 490, where the frame may be forwarded on the port associated with the DA and the method 400A may then end. If the condition in block 432 is not met, then the method 400A may proceed to block 434. At block 434, the method 400A may determine whether the frame is a flood frame. If the frame is labeled a flood frame, then the method 400A may proceed to block 436, where the frame may be forwarded on all ports except the source port, and the method 400A may end. For example, the bridge may label the frame as a flood frame and flood the frame on the ports associated with its neighboring nodes but not the receiving port. However, the frame may not be labeled a flood frame when transmitted on external ports to end nodes or external nodes outside the mesh bridging domain. Otherwise, if the condition in block 434 is not met, then the method 400A may proceed to block 450, where the frame may be discarded (e.g. deleted) and the method 400A may end.

Alternatively, at block 440, the method 400A may determine whether the frame is a flood frame, if the frame is labeled as a flood frame. If the frame is a flood frame, then the method 400A may proceed to block 450, where the frame may be discarded. Otherwise, if the condition in block 440 is not met, then the method 400A may proceed to block 445, where the method 400A may determine whether the DA in the frame is found in the FDB. For example, the bridge may search the local FDB entries for the DA in the frame. If an entry that corresponds to the DA in the frame is found, then method 400A may proceed to block 490, where the frame may be forwarded on the port associated with the DA. If the condition in block 445 is not met, then the method 400A may proceed to block 450 to discard the frame.

Figure 4B:
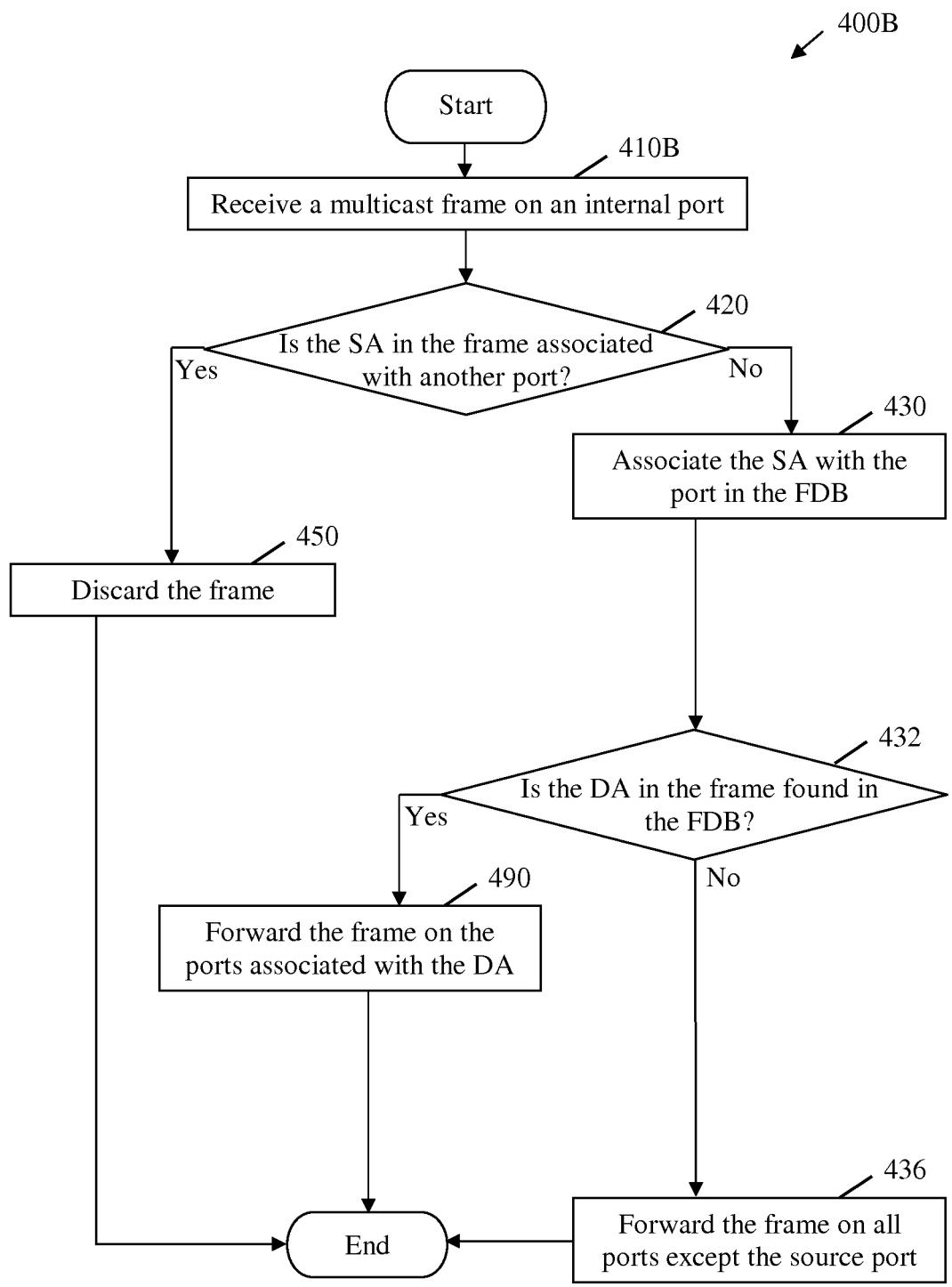
FIG. 4B is a flowchart of another embodiment of a learning and forwarding method.

FIG. 4B illustrates an embodiment of another learning and forwarding method 400B, which may be used to establish a bridged path between a plurality of bridges or switches, e.g. in a mesh-like topology. Similar to the method 400A, the method 400B may be implemented for an internal node that receives a frame on an internal port of the mesh bridging domain, e.g from another internal node. However, the received frame may be a multicast frame that comprises a group DA but not a unicast frame.

The method 400B may begin at block 410B, where a multicast frame may be received on an internal port of the bridge. The frame may comprise a SA that indicates the source of the frame, a group DA that indicates a plurality of destination nodes (e.g. in a multicast group), or both. At block 420, the method 400B may determine whether the SA in the frame is associated with another port of the bridge that is different from the receiving port. If the SA in the frame is associated with another port, then the method 400B may proceed to block 450. Otherwise, if the condition in block 420 is not met, then the method 400B may proceed to block 430. The subsequent blocks 432, 436, 450, and 490 of the method 400B may be similar to the corresponding blocks of the method 400A above. The remainder of the learning and forwarding logic in the method 400B follows the sequence of the blocks in FIG. 4B.

Figure 4C:
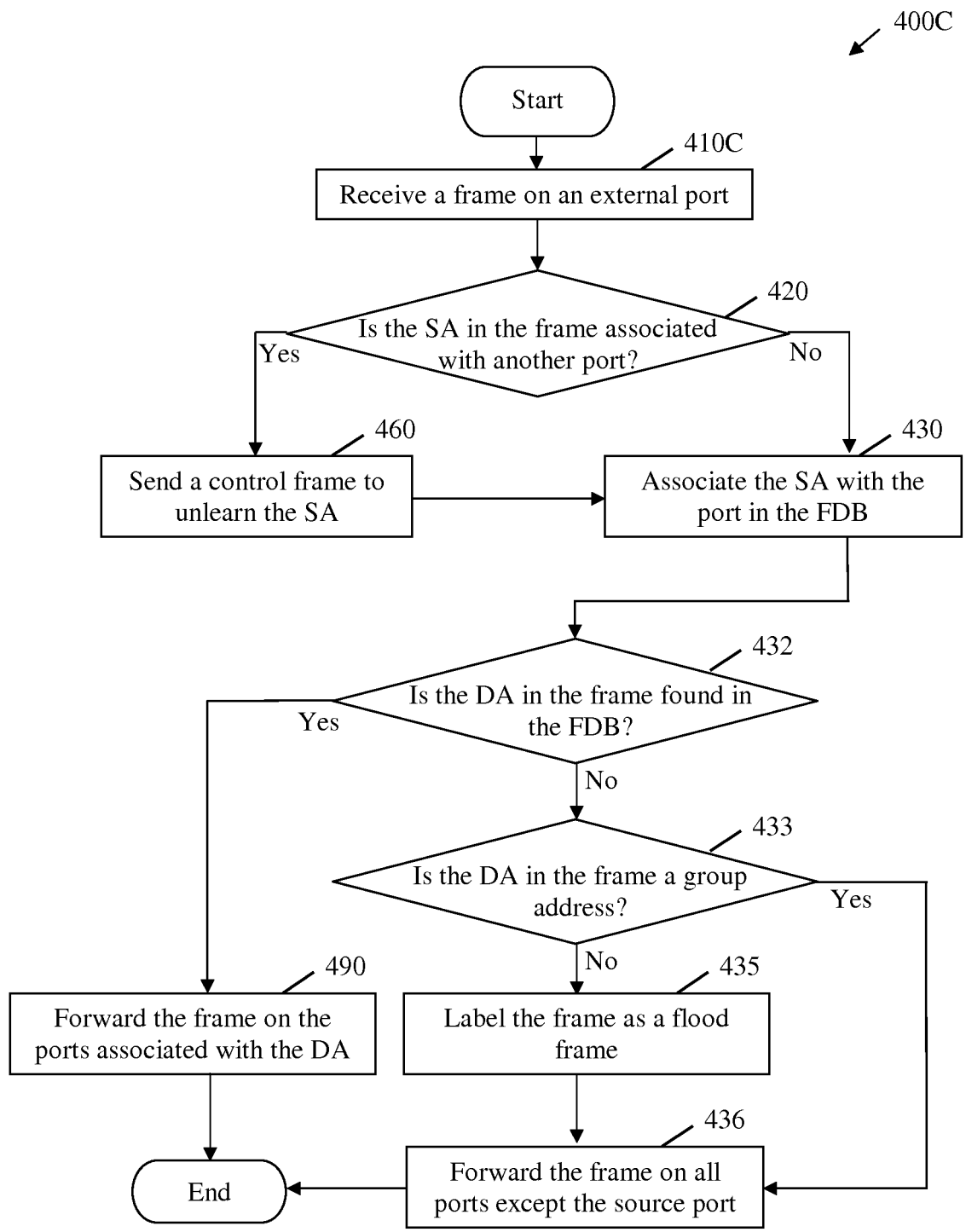
FIG. 4C is a flowchart of another embodiment of a learning and forwarding method.

FIG. 4C illustrates an embodiment of another learning and forwarding method 400C, which may be used to establish a bridged path between a plurality of bridges or switches, e.g. in a general mesh-like topology. Unlike the methods 400A and 400B, the method 400C may be implemented for an internal node in mesh bridging domain that receives a frame on an external port to the mesh bridging domain, such as from an end node 110 in the network 100. The received frame may be a unicast frame that comprises an individual DA or a multicast frame that comprises a group DA.

The method 400C may begin at block 410C, where a frame may be received on an external port of the bridge. For example, an internal node 120 in the network 100 may receive a unicast frame or a multicast frame on its external port from an end node 110. The frame may comprise a SA that indicates the source of the frame, a DA that indicates a single or a plurality of destination nodes, or both. At block 420, the method 400C may determine whether the SA in the frame is associated with another port of the bridge that is different from the receiving port. If the SA in the frame is associated with another port, then the method 400C may proceed to block 460, where a control frame may be sent to unlearn the SA, e.g. on the ports of a previously established path for the SA. Otherwise, if the condition in block 420 is not met, then the method 400C may proceed to block 430.

At block 430, the SA may be associated with a port in the FDB. At block 432, the method 400C may determine whether the DA in the frame is found in the FDB. If a FDB entry for the DA is found, then the method 400C may proceed to block 490, where the frame may be forwarded on the ports associated with the DA and the method 400C may end. Otherwise, if the condition in block 432 is not met then the method 400C may proceed to block 433. At block 433, the method 400C may verify whether the DA is a group address. If the DA is a group address, then the method 400C may proceed to block 436, where the frame may be forwarded on all ports except the source port and the method 400C may end. Otherwise, if the DA is a unicast or individual DA, then the method 400C may proceed to block 435, where the frame may be labeled as flood frame. Subsequently, the method 400C may proceed to block 436 to flood the frame. The frame may be labeled as a flood frame when transmitted on all internal ports coupled to internal nodes in the mesh bridging domain. However, the frame may be transmitted without being marked or labeled as a flood frame on an external node outside the mesh bridging domain.

Figure 5:
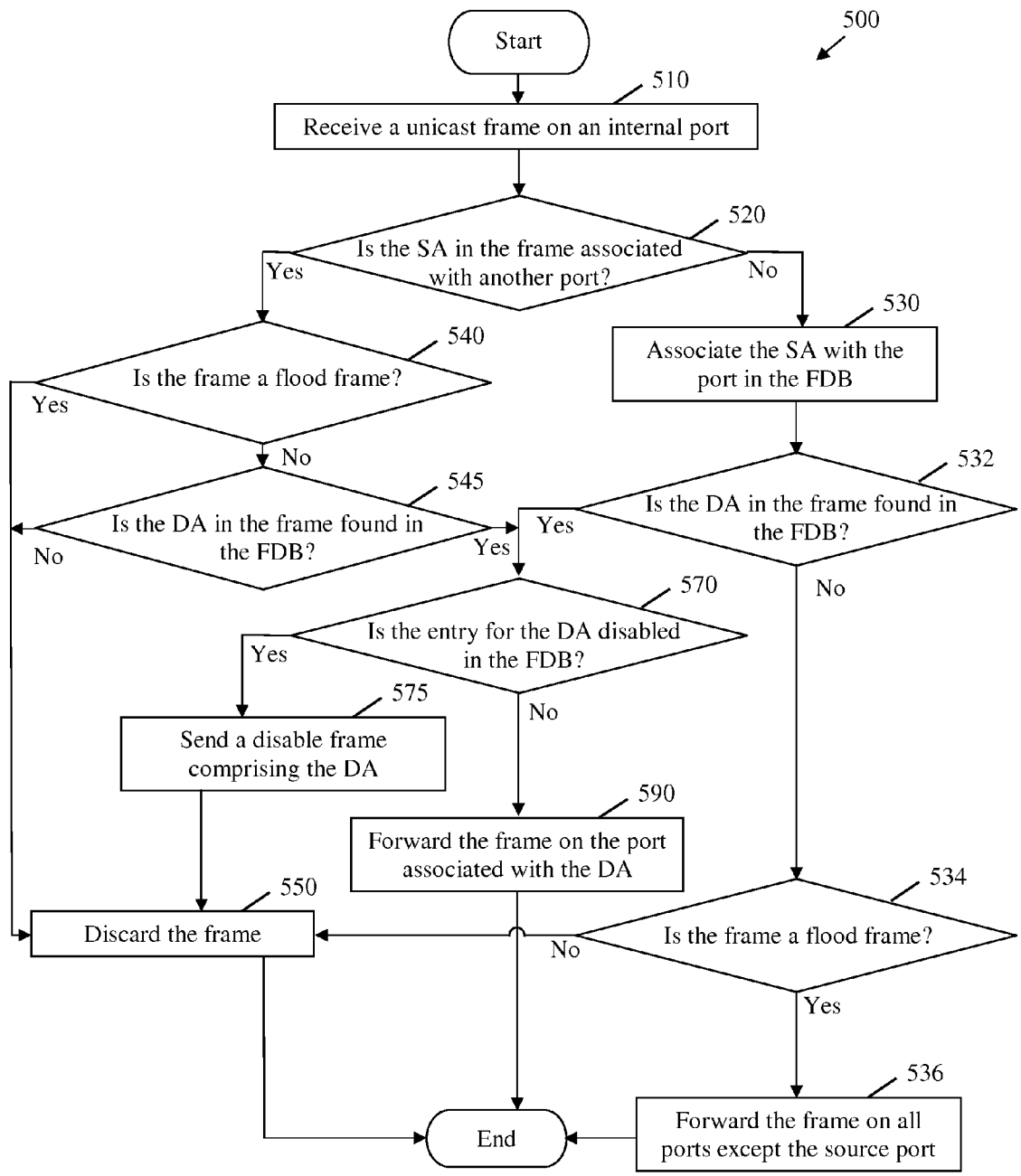
FIG. 5 is a flowchart of another embodiment of a learning and forwarding method.

FIG. 5 illustrates an embodiment of another learning and forwarding method 500, which may be used to establish a bridged path between a plurality of bridges or switches and may support link fault recovery. According to the method 500, the status of FDB entries may be checked before forwarding a frame to avoid forwarding or flooding the frame when the FDB entry corresponding to the frame's address has been disabled according to a link fault recovery procedure. The method 500 may be implemented at an internal node that receives a frame on an internal port of a mesh bridging domain, e.g. from another internal node in the mesh bridging domain.

The method 500 may begin at block 510, where a frame may be received on an internal port of the bridge. The remaining blocks 520 530, 532, 534, 536, 540, 545, 550, and 590 may be similar to the corresponding blocks of the method 400A. Thus, the method 500 may follow a similar learning and forwarding logic as the method 400A. However, to support link fault recovery, when the condition in blocks 532 or 545 is met, e.g. if the DA in the frame is found in the FDB, then the method 500 may proceed to block 570 instead of block 590. At block 570, the method 500 may verify whether the entry for the DA is disabled in the FDB, e.g. due to a link failure. If the FDB entry for the DA is disabled, the method 500 may proceed to block 575, where a disable frame comprising the DA may be sent, e.g. on the port from which the frame was received. Subsequently, the method 500 may proceed to block 550, where the frame may be discarded. Alternatively, if the condition in block 570 is not met, the method 500 may proceed to block 590, where the frame may be forwarded on the port associated with the DA.

Figure 6:
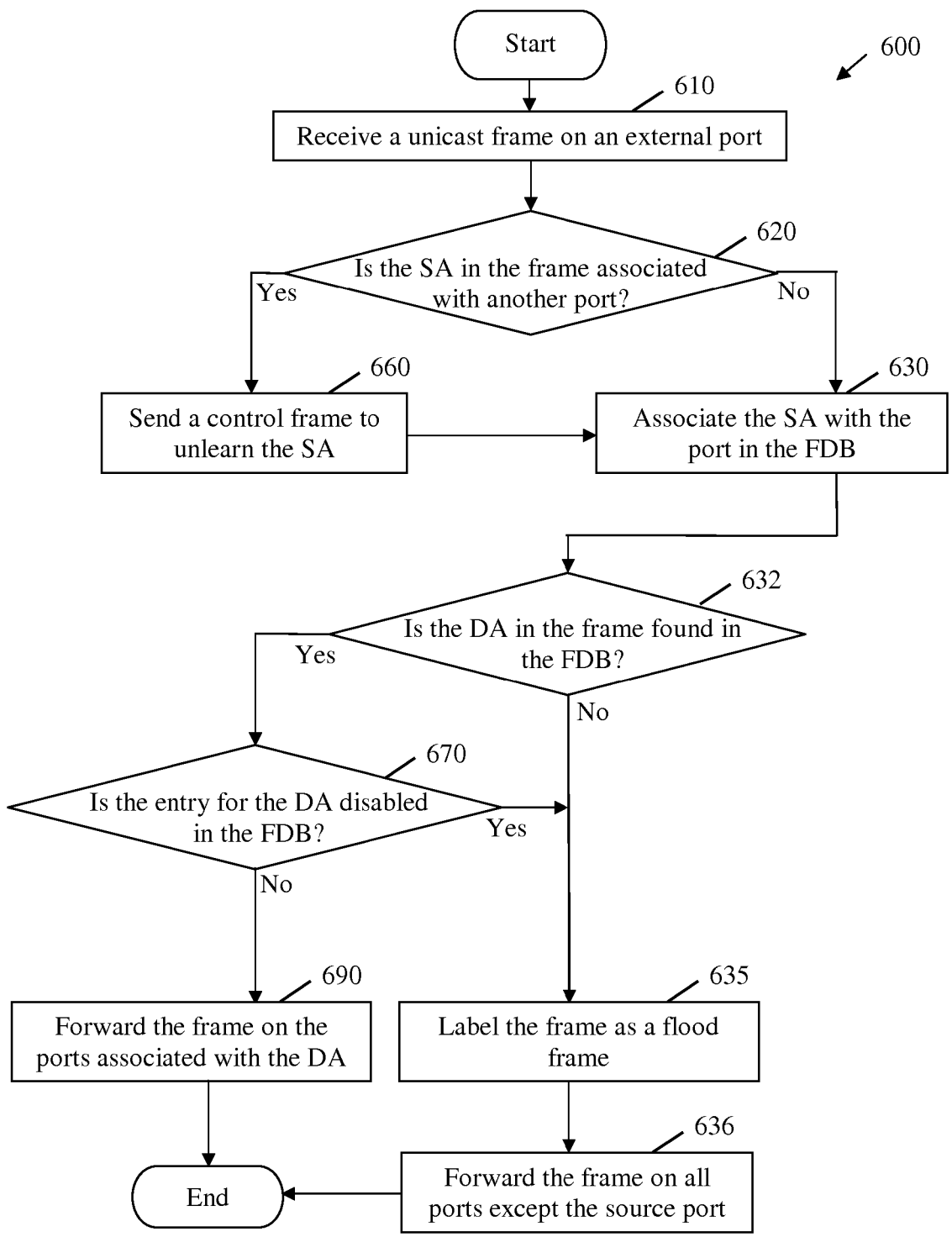
FIG. 6 is a flowchart of another embodiment of a learning and forwarding method.

FIG. 6 illustrates an embodiment of another learning and forwarding method 600, which may be used to establish a bridged path between a plurality of bridges or switches and support link fault recovery. The method 600 may be implemented at an internal node that receives a frame on an external port of a mesh bridging domain, e.g. from an external node outside the mesh bridging domain. Further, the frame may be a unicast frame that comprises a unicast or individual DA. The method 600 may begin at block 610, where a unicast frame may be received on an external port of the bridge. The remaining blocks 620, 630, 632, 635, 636, 660, and 690 may be similar to the corresponding blocks of the method 400C. Thus, the method 600 may follow a similar learning and forwarding logic as the method 400C. However, to support link fault recovery, when the condition in block 632 is met, e.g. if the DA in the frame is found in the FDB, then the method 600 may proceed to block 670. At block 670, the method 600 may verify whether the entry for the DA is disabled in the FDB, e.g. due to a link failure. If the FDB entry for the DA is disabled, the method 600 may proceed to block 635, where the frame may be labeled a flood frame and hence flooded to other nodes, or alternatively may be sent without labeling in the case of forwarding over an external port. Alternatively, if the condition in block 670 is not met, the method 600 may proceed to block 690, where the frame may be forwarded on the ports associated with the DA.

Figure 7A:
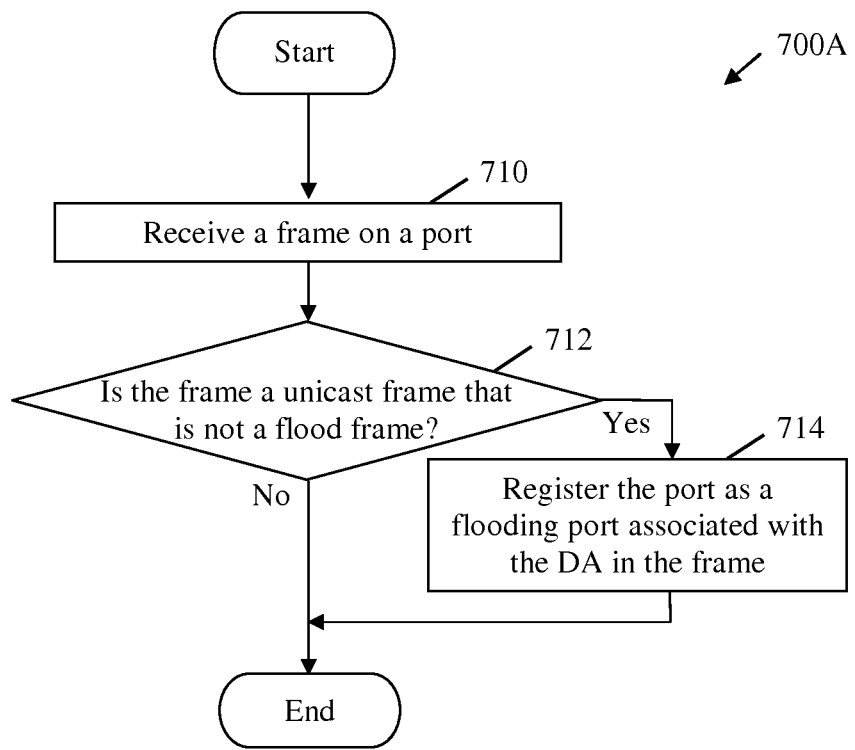
FIG. 7A is a flowchart of another embodiment of a learning method.

FIG. 7A illustrates an embodiment of another learning method 700A, which may be used to establish a bridged path between a plurality of bridges or switches and to register flooding ports for group DAs. According to the method 700A, a set of flooding ports for a group DA may be learned by learning the ports on which an individual or unicast DA is received in a non-flooded frame. As such, the node may subsequently send any multicast frames comprising a group DA and an SA matching the individual DA on the flooding ports associated with the individual DA but not on the remaining ports and hence may avoid forwarding the multicast frames to neighboring nodes that may discard or filter the frames.

The method 700A may begin at block 710, where a frame may be received on a port of the bridge. At block 712, the method 700A may determine whether the frame is a unicast frame that is not a flood frame. If the frame is a unicast frame that is not labeled as a flood frame, then the method 700A may proceed to block 714, where the port may be registered as a flooding port associated with the DA in the frame and the method 700A may then end. Otherwise, if the condition in block 712 is not met, e.g. if the frame is a flood frame or comprises a group DA, then the method 700A may end. Subsequently, e.g. after receiving and processing the frame using the method 700A, the frame may be further processed using any of the learning and forwarding methods described as appropriate.

Figure 7B:
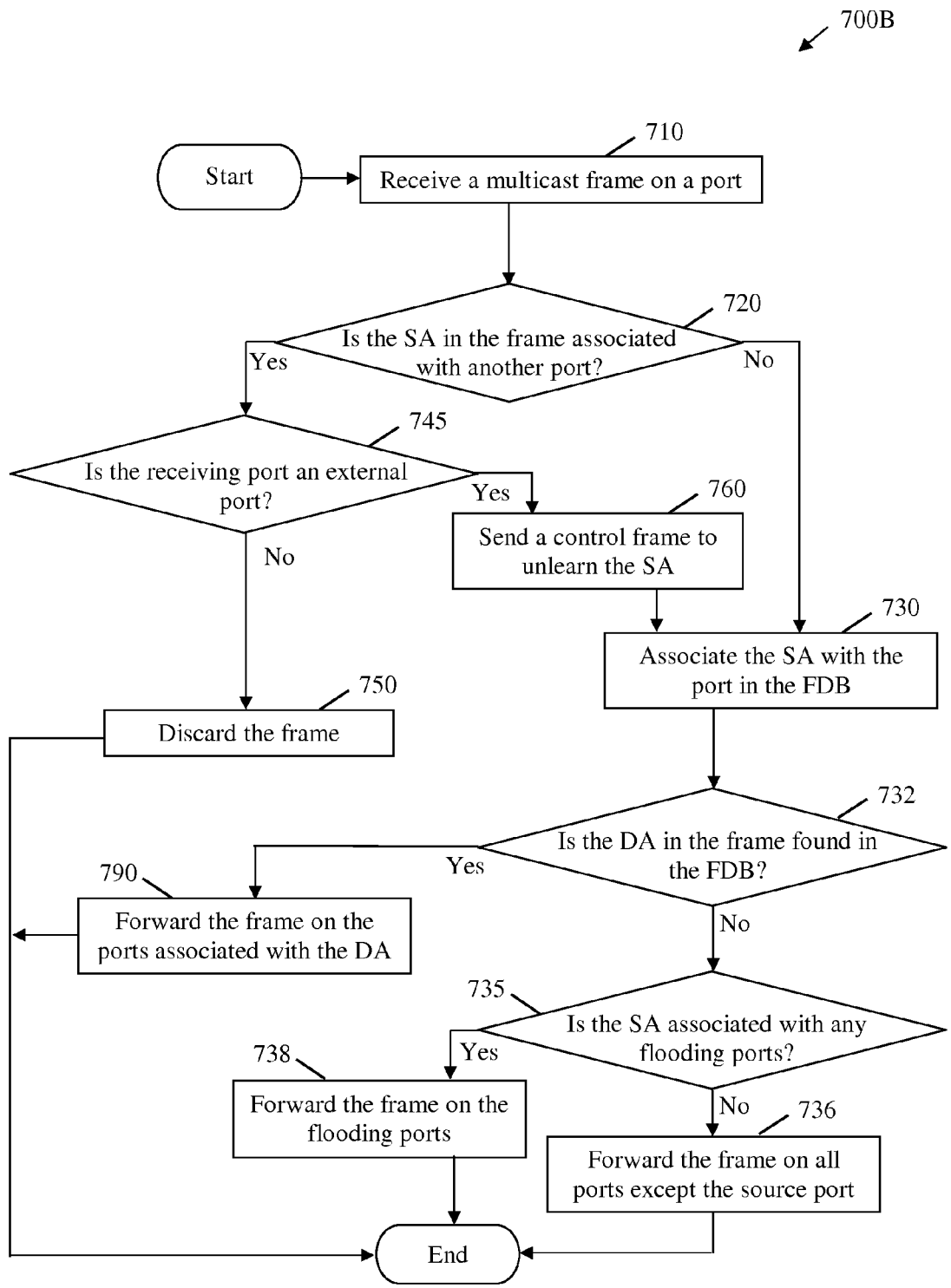
FIG. 7B is a flowchart of another embodiment of a learning and forwarding method.

FIG. 7B illustrates an embodiment of another learning and forwarding method 700B, which may be used to establish a bridged path between a plurality of bridges or switches and to handle multicast frames. The method 700B may begin at block 710, where a multicast frame may be received on an external port of the bridge. At block 720, the method 700B may determine whether the SA in the frame is associated with another port of the bridge that is different from the receiving port. If the SA in the frame is associated with another port, then the method 700B may proceed to block 745. Otherwise, if the condition in block 720 is not met, then the method 700B may proceed to block 730.

At block 730, the SA may be associated with a port in the FDB. At block 732, the method 700B may determine whether the DA in the frame is found in the FDB. If a FDB entry for the DA is found, then the method 700B may proceed to block 790, where the frame may be forwarded on the ports associated with the DA and the method 700B may end. Otherwise, if the condition in block 732 is not met then the method 400C may proceed to block 735. At block 735, the method 700B may verify whether the SA is associated with any flooding ports. If the SA is associated with a flooding port or a set of flooding ports, then the method 700B may proceed to block 738, where the frame may be forwarded on the flooding ports, and then end. Otherwise, if the SA is not associated with any flooding ports, then the method 700B may proceed to block 736, where the frame may be forwarded on all ports except the source port and the method 700B may then end.

Alternatively, at block 745, the method 700B may verify whether the receiving port is an external port, e.g. coupled to an external node outside the mesh bridging domain. If the receiving port is an external port then the method 700B may proceed to block 760. Otherwise, if the receiving port is an internal port, e.g. coupled to an internal node inside the mesh bridging domain, then the method 700B may proceed to block 750, where the frame may be discarded and the method 700B may end. At block 760, a control frame may be sent to unlearn the SA and the method 700B may then proceed to block 730. For example, a URCF comprising the frame's SA as an UA may be multicast to unlearn the path previously established for the SA.

Figure 8:
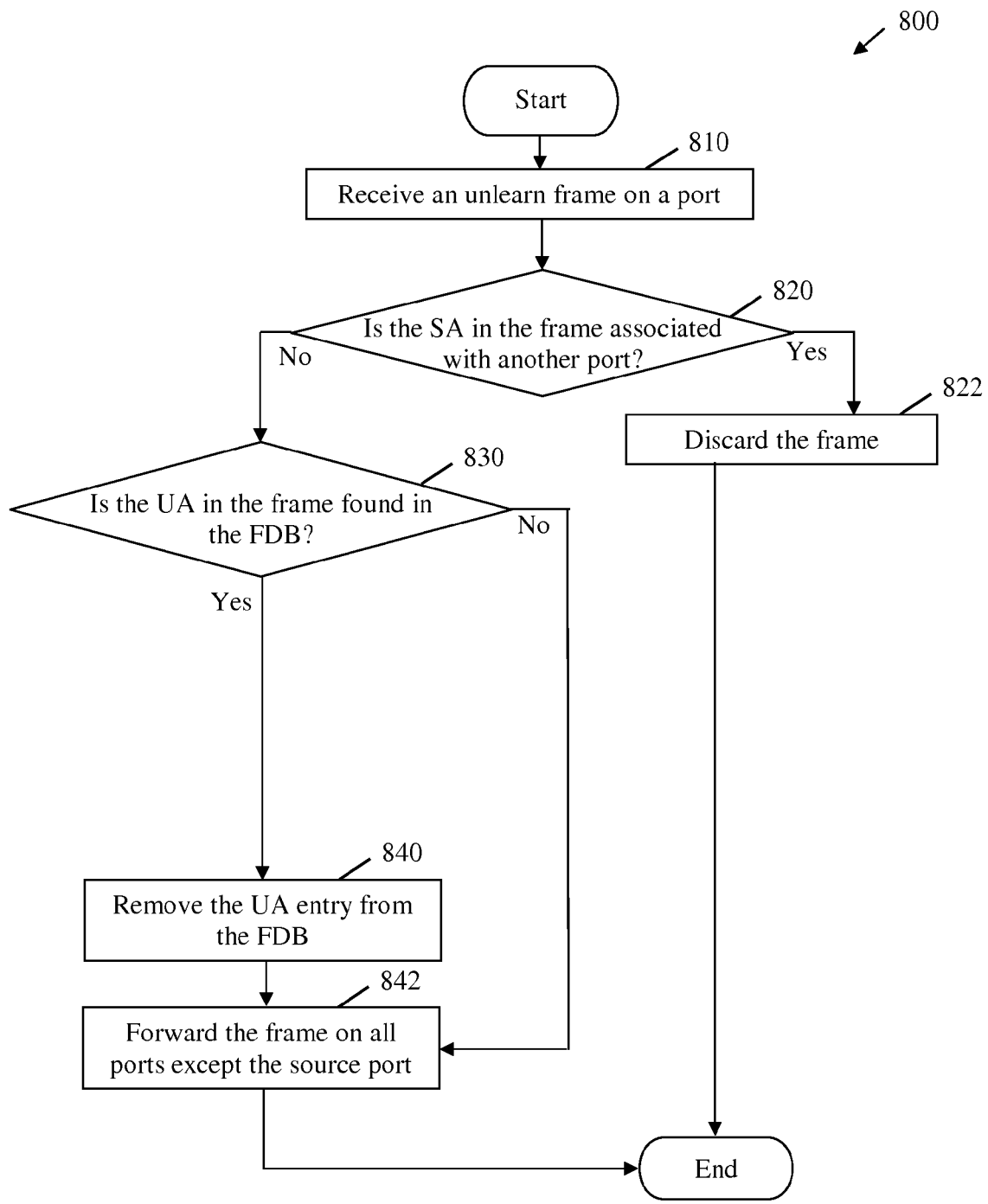
FIG. 8 is a flowchart of an embodiment of a unlearning and forwarding method.

FIG. 8 illustrates an embodiment of an unlearning and forwarding method 800, which may be used to handle relocation of addresses, e.g. MAC addresses. For example, the method 800 may be implemented in the case of moving a link of an end node or station from a port on an internal node (or switch) in a bridged path to another port. Subsequently, the address of the end node may be relearned on new ports of the internal nodes. The address that has relocated may be added as an UA in a unlearn frame, e.g. a URCF, which may be flooded to the nodes (except external nodes) to unlearn the address on previously associated source ports. The unlearn frame may also comprise the SA of the originating node to eliminate loops.

The method 800 may begin at block 810, where an unlearn frame may be received on a port of the bridge. For example, the bridge may receive a URCF or a frame labeled as unlearn frame. At block 820, the method 800 may determine whether the SA in the frame is associated with another port that is different than the receiving port. If the SA in the frame is associated with another port, then the method 800 may proceed to block 822, where the frame may be discarded and the method 800 may then end. Otherwise, if the condition in block 820 is not met, then the method 800 may proceed to block 830. At block 830, the method 800 may determine whether the UA in the frame is found in the FDB. If an entry that corresponds to the UA in the frame is found, then method 800 may proceed to block 840. Otherwise, if the condition in block 830 is not met, then the method 800 may proceed to block 842. At block 840, the UA entry may be removed from the FDB to unlearn the UA at the node. At block 842, the frame may be forwarded on all ports except the source port, which may be the receiving port in this case. The method 800 may then end. After implementing the method 800 to unlearn the address in the internal nodes associated with the address, e.g. on the path previously established for the address, any of the methods above may be implemented, as appropriate, to relearn the address on a new path.

Figure 9:
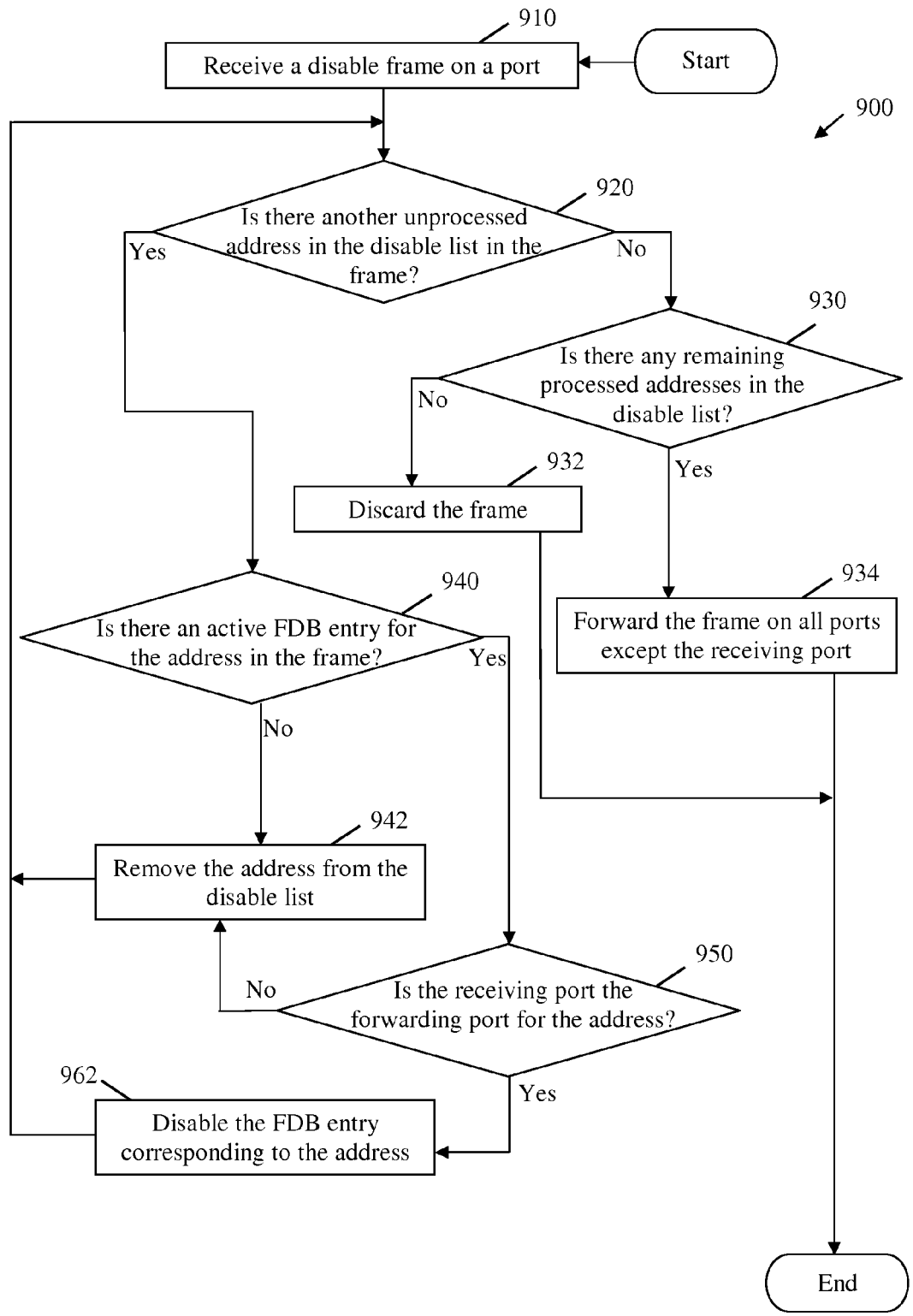
FIG. 9 is a flowchart of an embodiment of an address disabling and forwarding method.

FIG. 9 illustrates an embodiment of an address disabling and forwarding method 900, which may be used to provide link fault recovery in a network. The address disabling and forwarding method 900 may be used to update the FDB entries of the nodes or bridges in response to receiving a disable frame due to a link failure. The disable frame may comprise a list of learned unicast or individual addresses for which the FDB entries may be disabled, e.g. in the case when the received addresses are associated with the port on which the disable frame was received.

The method 900 may begin at block 910, where a disable frame may be received on a port of the bridge. The frame may be labeled as a disable frame or a DRCF, which may comprise a disable list of unicast addresses. At block 920, the method 900 may determine whether there is another unprocessed address (e.g. unicast DA) in the disable list in the frame. If there is another unprocessed address in the disable list, then the method 900 may proceed to block 940 to process the address. If the condition in block 920 is not met, then the method 900 may proceed to block 930. At block 930, the method 900 may determine whether there is any remaining processed address in the disable list in the frame. If there is any remaining processed address in the disable list, then the method 900 may proceed to block 934. If the condition in block 930 is not met, then the method 900 may proceed to block 932, where the frame may be discarded, and the method 900 may end. At block 934, the frame may be forwarded on all ports except the receiving port, and hence the method 900 may end.

Alternatively, at block 940, the method 900 may determine whether there is an active FDB entry for the address (e.g. unicast DA) in the frame. If there is an active FDB entry for the address in the frame, e.g. where the address is associated with a source port, then the method 900 may proceed to block 950. If the condition in block 940 is not met, then the method 900 may proceed to block 942. At block 942, the address may be removed from the disable list, and the method 900 may return to block 920 to process any remaining address. At block 950, the method 900 may determine whether the receiving port is the forwarding port (e.g. source port) for the address (e.g. unicast DA). The forwarding port may be associated with the address in the FDB entry that corresponds to the address. If the receiving port is the forwarding port of the address, then the method 900 may proceed to block 962. If the condition in block 950 is not met, then the method 900 may proceed to block 942. At block 962, the FDB entry corresponding to the address may be disabled, and the method 900 may return to block 920.

Figure 10:
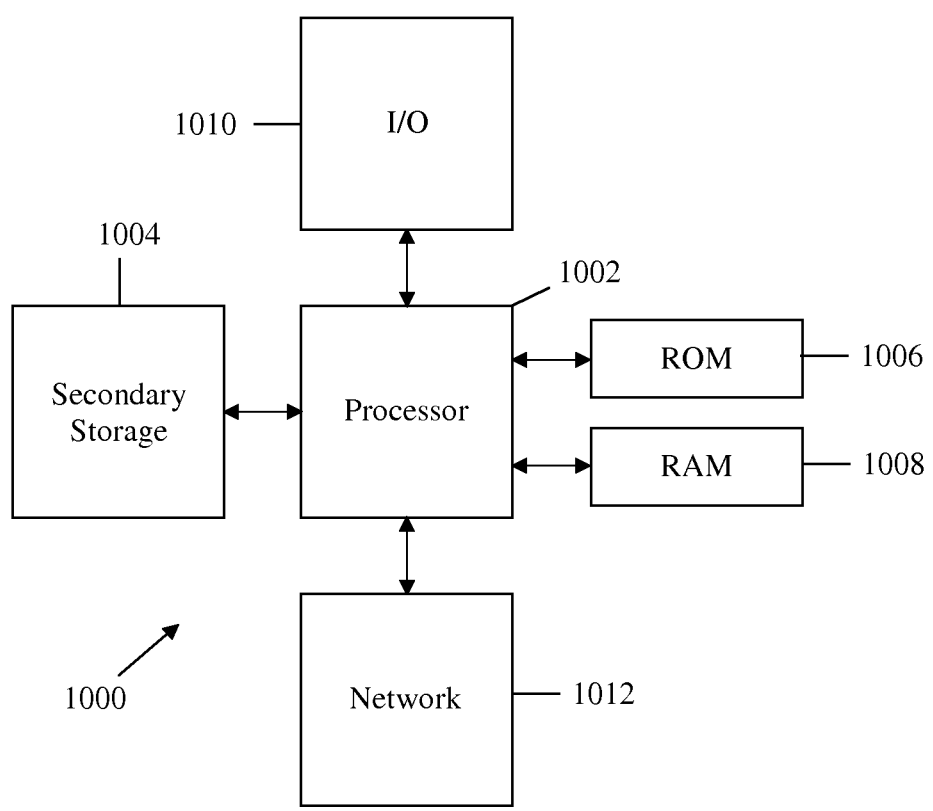
FIG. 10 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a switch comprising a plurality of ports, wherein the switch:
receives a plurality of frames each comprising a destination address (DA) via a first input port of the plurality of ports;
marks a first frame from the plurality of received frames as a flood frame if the DA is not previously learned on any of the plurality of ports, wherein subsequent to being marked as a flood frame, the first frame is distinguishable from a non-marked frame of the plurality of the received frames; and
forwards the marked frame to the remaining ports of the plurality of ports that is not the first input port.

2. The apparatus of claim 1, wherein the first frame comprises a source address (SA), wherein the switch further discards the first frame when the SA is previously learned on a second input port, and wherein the second input port is different from the first input port.

3. The apparatus of claim 1, wherein the switch further forwards the marked frame to a plurality of nodes connected in a mesh-like topology via the remaining ports of the plurality of ports.

4. The apparatus of claim 1, wherein the DA was not previously learned on the second input port when the DA is not found in a filtering database (FDB) comprising a plurality of addresses, and wherein each of the plurality of addresses is associated with one port of the plurality of ports.

5. The apparatus of claim 4, wherein the switch further forwards the marked frame to the port that is associated with the DA when the DA matches one of the plurality of addresses in the FDB.

6. The apparatus of claim 1, wherein the frame is a multicast frame, and wherein the first input port of the plurality of ports is an external port that receives the first frame from an end node, and wherein the external ports is within the apparatus.

7. The apparatus of claim 1, wherein the switch further determines whether the first frame has already been marked as the flood frame prior to receiving the first frame.

8. The apparatus of claim 7, wherein the first frame comprises a source address (SA), wherein the switch discards the first frame when the first frame has been determined as the flood frame prior to receiving the first frame and the SA is associated with the second input port, and wherein the first input port is different from the second input port.

9. The apparatus of claim 7, wherein the switch further discards the first frame when the DA does not match one of the plurality of addresses in a filtering database(FDB) and the first frame has not been marked the flood frame prior to receiving the frame.

10. An apparatus comprising:
a switch comprising a plurality of ports, wherein the switch:
receives a plurality of frames each comprising a destination address (DA) via a first input port of the plurality of ports;
marks a first frame from the plurality of received frames as a flood frame if the DA is not previously learned on any of the plurality of ports, wherein subsequent to being marked as a flood frame, the first frame is distinguishable from a non-marked frame of the plurality of the received frames; and
forwards the marked frame to the remaining ports of the plurality of ports that is not the first input port,
wherein the first frame is marked as the flood frame by setting a group bit in the DA or source address (SA) in the first frame.

11. An apparatus comprising:
a switch comprising a plurality of ports, wherein the switch:
receives a plurality of frames each comprising a destination address (DA) via a first input port of the plurality of ports;
marks a first frame from the plurality of received frames as a flood frame if the DA is not previously learned on any of the plurality of ports, wherein subsequent to being marked as a flood frame, the first frame is distinguishable from a non-marked frame of the plurality of the received frames; and forwards the marked frame to the remaining ports of the plurality of ports that is not the first input port, wherein the first frame is marked as the flood frame by encapsulating the first frame with a label that specifies the first frame is the flood frame.

12. An apparatus comprising:

a switch comprising a plurality of ports, wherein the switch:

receives a plurality of frames each comprising a destination address (DA) via a first input port of the plurality of ports;

marks a first frame from the plurality of received frames as a flood frame if the DA is not previously learned on any of the plurality of ports, wherein subsequent to being marked as a flood frame, the first frame is distinguishable from a non-marked frame of the plurality of the received frames; and forwards the marked frame to the remaining ports of the plurality of ports that is not the first input port, wherein the first frame is marked as the flood frame by modifying a field in the first frame that specifies the first frame is the flood frame.

13. An apparatus comprising:

a switch comprising a plurality of ports, wherein the switch:

receives a plurality of frames each comprising a destination address (DA) via a first input port of the plurality of ports;

marks a first frame from the plurality of received frames as a flood frame if the DA is not previously learned on any of the plurality of ports, wherein subsequent to being marked as a flood frame, the first frame is distinguishable from a non-marked frame of the plurality of the received frames; and forwards the marked frame to the remaining ports of the plurality of ports that is not the first input port, wherein the switch further forwards the marked frame to the remaining ports of the plurality of ports if the DA is a group DA and a source address (SA) in the marked frame is associated with a source port of the plurality of ports.

14. An apparatus comprising:

a processor, wherein the processor:

receives a frame marked as a flooded frame on a first port, wherein the received frame comprises a source address (SA) and a destination address (DA);

compares the SA to a plurality of addresses in a filtering database (FDB);

compares the DA to the plurality of addresses in the FDB; and forwards the received frame to a plurality of ports that is not the first port when the DA is not found in the plurality of addresses in the FDB and the SA is not found in the plurality of addresses in the FDB.

15. The apparatus of claim 14, wherein the processor further discards the frame when the SA matches one of the plurality of addresses in the FDB that is associated with a second port and the first port and the second port are different.

16. The apparatus of claim 14, wherein the FDB is stored in the apparatus, and wherein the received frame is distinguishable from an unflooded frame.

17. The apparatus of claim 14, wherein each of the plurality of addresses in the FDB is associated with one port of the plurality of ports, wherein the processor further forwards the received frame to a second port of the plurality of ports when the DA matches one of the addresses in the FDB, and wherein the second port is associated with the DA.

18. The apparatus of claim 14, wherein the received frame is a unicast frame, and wherein the first port of the plurality of ports receives the received frame from an internal node.

19. A method for implementing frame flooding and address learning behavior, the method comprising:

receiving a frame comprising a source address (SA) and destination address (DA) on a first port;

determining whether the SA is associated to a second port, wherein the second port is different from the first port;

determining whether the DA is found in a filtering database (FDB);

marking the received frame as a flooded frame when the DA is not found in the FDB and the SA is not associated to the second port; and forwarding the marked frame to a plurality of output ports when the SA is not associated to the second port and the DA is not found in the FDB.

20. The method of 19 further comprising:

determining whether the received frame was previously marked as the flooded frame; and discarding the received frame when the SA is associated to the second port and the frame was previously marked as the flooded frame.

* * * * *

UNITED STATES PATENT AND TRADEMARK OFFICE
CERTIFICATE OF CORRECTION

PATENT NO. : 8,451,842 B2
APPLICATION NO. : 12/762659
DATED : May 28, 2013
INVENTOR(S) : T. Benjamin Mack-Crane et al.

Page 1 of 1

It is certified that error appears in the above-identified patent and that said Letters Patent is hereby corrected as shown below:

In the Claims:

Column 18/Line 40 should read: "the plurality of addresses in a filtering database (FDB) and the"

Column 19/Line 6 should read: "plurality of ports that is not the first input port,"

Signed and Sealed this
Twenty-seventh Day of August, 2013

Teresa Stanek Rea
*Acting Director of the United States Patent and Trademark Office*